United States Patent [19]
Higgins

[11] 3,881,824
[45] May 6, 1975

[54] ALIGNMENT AND CONTROL SYSTEM
[75] Inventor: John Higgins, Arlington, Va.
[73] Assignee: Minister of National Defence, Ottawa, Canada
[22] Filed: Mar. 2, 1973
[21] Appl. No.: 337,370

[30] Foreign Application Priority Data
Mar. 17, 1972 Canada ................................ 137317

[52] U.S. Cl. .................. 356/141; 356/152; 356/172
[51] Int. Cl. ............................................ G01b 11/26
[58] Field of Search.................... 356/141, 152, 172; 343/106 R, 102

[56] References Cited
UNITED STATES PATENTS
3,107,352  10/1963  Shapcott............................. 343/102
3,400,398  9/1968   Lapeyre et al. ................. 343/106 R
3,798,759  3/1974   Michelson........................... 356/152

FOREIGN PATENTS OR APPLICATIONS
1,181,162  2/1970  United Kingdom................. 356/152

Primary Examiner—Maynard R. Wilbur
Assistant Examiner—S. C. Buczinski

[57] ABSTRACT

An azimuth alignment system which is particularly useful for aligning artillery guns. One of the problems with alignment devices has been the slow rate at which information can be transmitted between a control position and an element or elements to be aligned. The system comprises a reference unit which is located in a known orientation and is provided with an omnidirectional beacon emitting pulsed radiation. Also mounted on the unit is a revolving means which provides a highly collimated light beam. Means is connected with the revolving means for causing the beacon to signal the passing of a datum position thereby. The gun, or other element to be aligned in azimuth is located within the range of the reference unit and is provided with a receiver unit having means to receive and count the pulses from the beacon. Suitably, the means which receives and counts the pulses drives a display and is responsive to the datum position passing signal to zero the count, it further has means which detects the revolving means when it passes the receiver unit and locks the count at its instantaneous reading. In this fashion, there is presented an indication of a geometrical angle of the gun, or other element, position relative to the datum so that the gun, or other element, may be aligned.

12 Claims, 7 Drawing Figures 3,881,824

ALIGNMENT AND CONTROL SYSTEM

BACKGROUND OF INVENTION

This invention relates to devices for aligning elements in azimuth and has a particular application to devices for aligning guns of artillery batteries.

With the advent of self-propelled artillery and other new artillery equipment the standard process of gun control is no longer adequate if the mobility and speed into action of the new equipment are to be realized effectively.

One of the prime problems is the method of fire control within the gun battery. Before the guns can be fired they have to be aligned, that is two reference lines have to be defined at each gun. The first or vertical reference line, for gun elevation, is readily determined using gravity. The second or azimuth reference line (usually the north direction) is more difficult to define and maintain.

Currently when an artillery battery is in the process of relocating, a reconnaissance party establishes a new battery site and they mark the gun positions to be taken up by the guns of the battery and also set up the battery aiming circle or director. This instrument is a military version of a transit. The azimuth scale of the aiming circle is aligned using a magnetic compass or a gyro-orientor. The guns are then moved into position and are aligned parallel to each other, usually in the center of arc direction, that is to say a direction which allows the normal traverse of the guns to cover the sector of main interest. Alignment of the guns is carried out using the reciprocal bearing method. Taking each gun in succession, the bearing of that gun from the aiming circle is measured and passed to the gun by voice, radio or runner. The gun sight when pointed at the aiming circle is then pointing in the reciprocal bearing. By using the scales on the gun sight, one of which indicates the angle between the gun sight optical axis and the direction in which the gun tube is pointing, the gun tube can be offset the required calculated amount so that it is aligned on the chosen center of arc. To prevent errors, each reading is independently checked and all the data is passed at least twice, that is from aiming circle to gun and from gun to aiming circle. The whole process has to be repeated at least twice since the position of the gun sight, which is offset from the center of rotation of the gun, will change if the gun is moved to point in the center of arc direction. This is then repeated for each gun on the battery. When this process is completed the battery is aligned and prepared to receive requests for fire.

Usually reference poles are set out by each gun crew so that after the gun is fired any displacement for the original position caused by the recoil of the gun can be adjusted.

A major drawback of the existing system is the great length of time required to align a troop of guns. For example in bad weather conditions it can take anything from 10 to 30 minutes to perform the alignment operation and in mobile modern warfare where weapons must be moved frequently this delay becomes an important factor. A further drawback of the system is that since the method involves computation of angles, manual settings and reading of aiming circles and sights and verbal passage of information there is a marked probability of human error especially in action conditions. Furthermore the number of guns which can be handled by the present aiming circle is restricted because of the time necessary to handle each gun.

SUMMARY OF INVENTION

The present invention provides an azimuth alignment system comprising a reference unit adapted to be aligned in a known orientation; a revolving means for providing a highly collimated light beam on said reference unit; data transmission means, angular data generating means connected with said revolving means for causing the data transmission to signal incremental angular movement of, and the passing of a datum position by, the revolving means; at least one element to be aligned in azimuth; a receiver means on said element having means to detect the highly collimated light beam and to receive and interpret the data from the data transmission means, and therefrom to provide azimuth information whereby said element may be aligned.

The data transmission means may conveniently be a beacon emitting modulated radiation, for example, pulsed radiation, and the data generating means conveniently may be an angular encoder.

According to a feature of the invention, the receiver means includes an oscillator means which additionally refines said data.

In one embodiment of the invention, the receiver means includes a comparator adapted to receive the data as a first input and as a second input a signal of the instantaneous alignment of the element and to produce a resultant error signal as a command signal, and means responsive to said command signal to align said element in azimuth.

In one aspect the present invention provides a system for use in aligning guns comprising a reference unit adapted to be positioned at a known orientation, a pulsed substantially omnidirectional beacon mounted on said reference unit; a revolving highly collimated light beam on said reference unit; means connected with said light beam for causing the beacon to signal the passing of a datum position by the light beam; at least one gun adapted to be randomly located within the range of the reference unit; a receiver means on the gun having means to receive and count the pulses from the beacon and to drive displays, and being responsive to said signal to zero the count; and further having means adapted to detect said light beam when it passes the receiver means and lock the display at the receiver means instantaneous count; thereby presenting an indication of an angle of gun position relative to said datum whereby to permit said gun to be aligned.

According to a feature of the invention the receiver means further comprises an oscillator means which additionally refines the displays, by providing interpolation between any two successive pulses received from the beacon.

In the preferred embodiment the displays are provided on numerical counters.

According to a further feature of the invention the receiver unit includes means for algebraically adding to said displays a value of an angle of a target bearing in order to display a target reference angle whereby said gun may be laid on said target.

BRIEF DESCRIPTION OF THE DRAWINGS

The following is a description by way of example of one embodiment of the invention as it applies to gun alignment, reference being had to the accompanying drawings in which.

DESCRIPTION OF THE PREFERRED EMBODIMENTS

Figure 1:
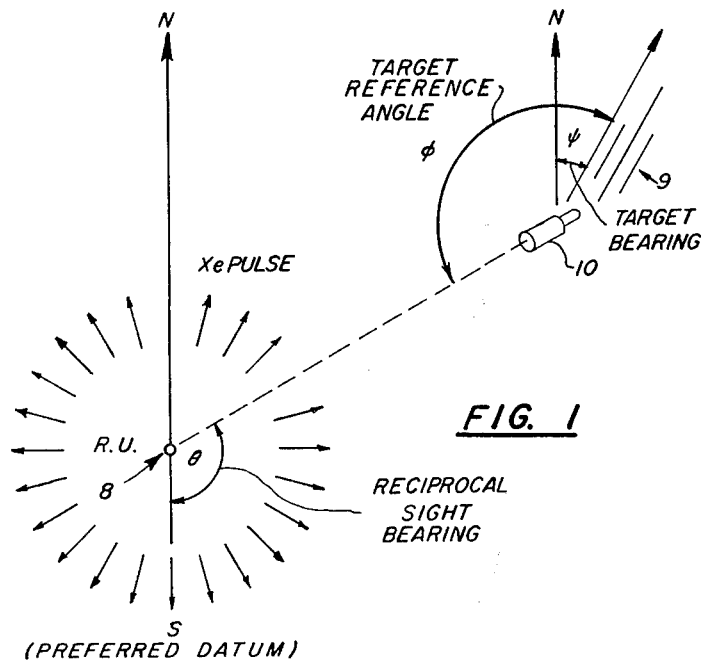
FIG. 1 is a diagrammatic representation of a gun position relative to a reference unit.

FIG. 1 illustrates the basic geometry involved in gun alignment procedures and defines the angles used in the description. A reference unit 8 is located near the artillery command post position and a battery of guns, one of which is diagrammatically illustrated at 9, are positioned about the command post roughly in a semicircle. Each gun has a receiver unit 10 mounted thereon to receive signals from the reference unit 8. The angular measure used in this specification will be that used by the military, 1 mil = 1/6,400 revolution.

Figure 2:
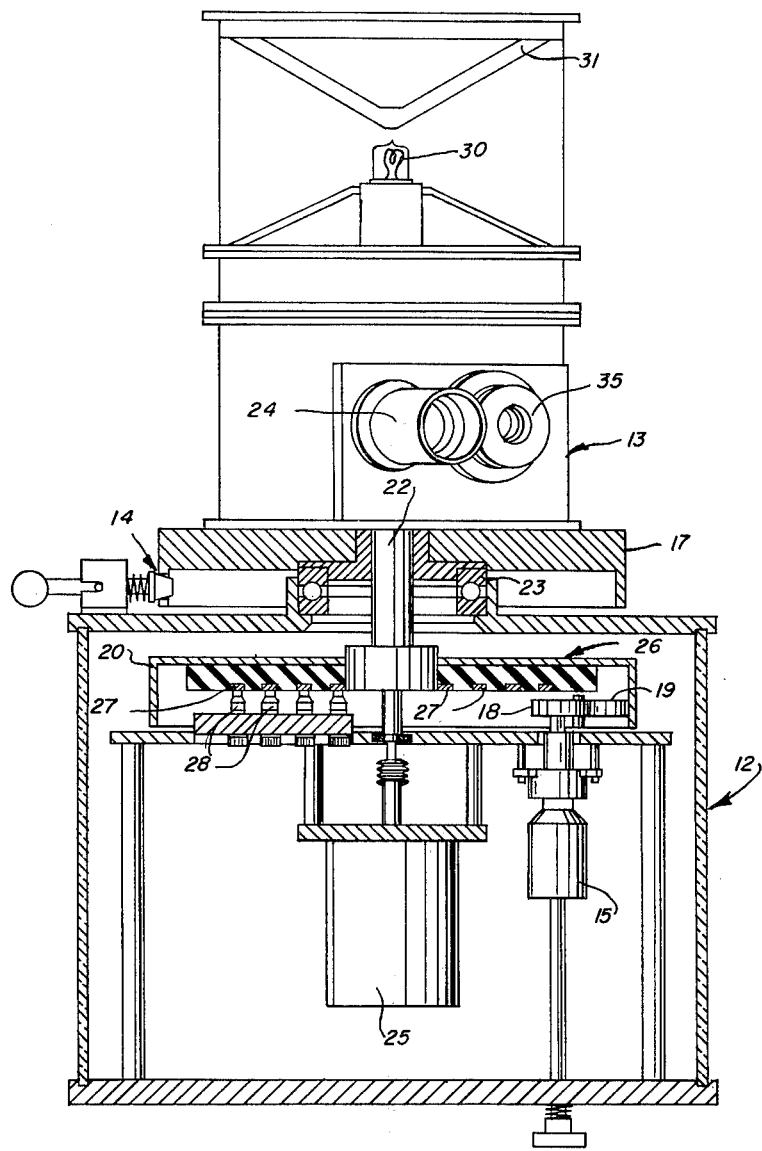
FIG. 2 is a diagrammatic representation of the mechanical layout of the reference unit.
Figure 3:
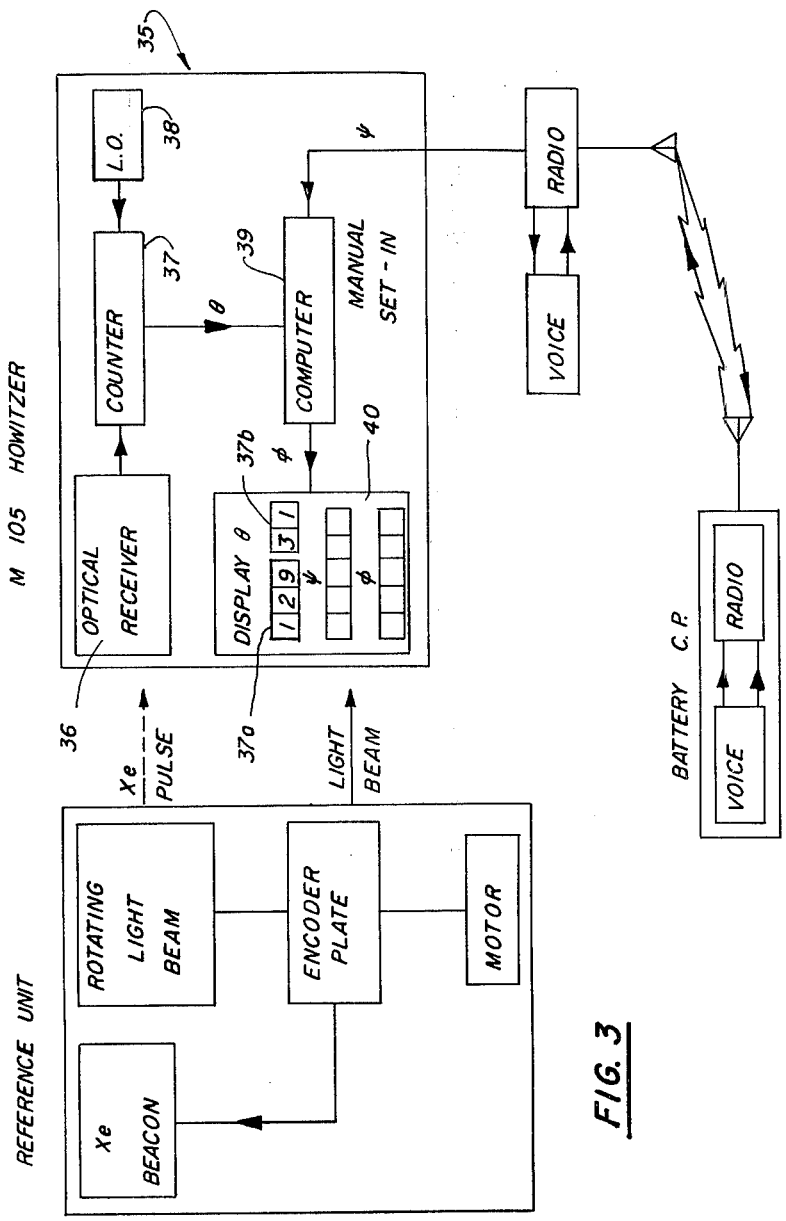
FIG. 3 is a block diagram representation of the elements comprising the reference unit and the receiver unit.

The refernece unit 8 (FIG. 2) consists of two sub-units 12 and 13 mounted on a tripod (not shown). The bottom sub-unit 12 is cylindrical in configuration and is mounted directly on the tripod head. The tripod head allows for the levelling of the reference unit. The upper sub-unit 13 is locked by lock pin 14 relative to sub-unit 12. The reference unit is then rotated so that it is aligned in azimuth with respect to a preferred grid datum (south) by means of a magnetic compass or gyro-orientor or other suitable means. When aligned in the correct position the lower sub-unit 12 is locked to the tripod head and the upper sub-unit released. The bottom sub-unit 12 contains power supplies (not shown), a motor 15 and a drive system for rotating the turntable 17 upon which the upper sub-unit 13 sits. The motor 15 may be an a.c. synchronous motor which derives its power from a supply controlled by a stable oscillator in conventional fashion. Alternatively, a d.c. motor with a tachometer type of speed control could be used. The drive system includes a disengageable drive wheel 18 driving through an idler 19 a driven plate 20. The driven plate 20 is fixed to a shaft 22 which in turn is keyed to the turntable 17. The turntable 17 rests on thrust bearings 23.

The upper sub-unit 13 includes two light sources. (The term, light source is used loosely here since in this embodiment all of the radiation emitted by the reference unit 8 is confined to that region of the spectrum above 0.7 microns, i.e. the near infrared). Once source, a pulsed GaAs laser unit 24, emits a narrow light beam (hereinafter referred to as the light beam) which rotates about the vertical axis of the reference unit and is driven at a uniform rate of, say, one revolution in 5 seconds by the motor 15. The radiation from the laser is shaped by an anamorphic optical system into a beam with a divergence of 0.5 mil in the horizontal plane and 280 mils in the vertical plane. Also mounted on the same axis is a transmission means, here, a Xenon flash tube 30 with a suitably shaped reflector 31 to give on-midirectional radiation in the horizontal plane with a beam spread of 280 mils in the vertical plane. (A suitable flash lamp could be an EG&G Type FX-6A). This will be referred to as the beacon. The beacon need not be totally omnidirectional provided that it have a spread sufficient to encompass all receivers associated with it. If necessary for security reasons, an optical filter can be used to enclose the beacon so that only infra-red radiation is emitted.

A slip ring assembly 27, 28 for feeding electrical power and trigger signals to the top sub-unit 13 is also provided. An angular data generating means, here an encoder plate 25, is mounted on the same shaft as the turntable 17 and provides electrical pulses denoting each 10 mil rotation of the turntable, i.e. 640 pulses per revolution. One additional reference pulse per revolution is also produced by the encoder when the light beam passes the datum denoting a zero position. This reference pulse is delayed 130 micro-seconds from one of the train pulses. In practice the train pulses from the shaft encoder trigger a controlled rectifier which in turn supplies triggering pulses to the Xenon flash lamp through a trigger transformer (not shown). The zero reference pulse occurring 130 micro-seconds after a train pulse triggers a second controlled rectifier and initiates a second discharge from the Xenon flash lamp. In this way a light pulse will be emitted by the beacon, marking each increment of 10 mils of revolution of the light beam and a double pulse is provided when the light beam passes through the zero direction.

Figure 4:
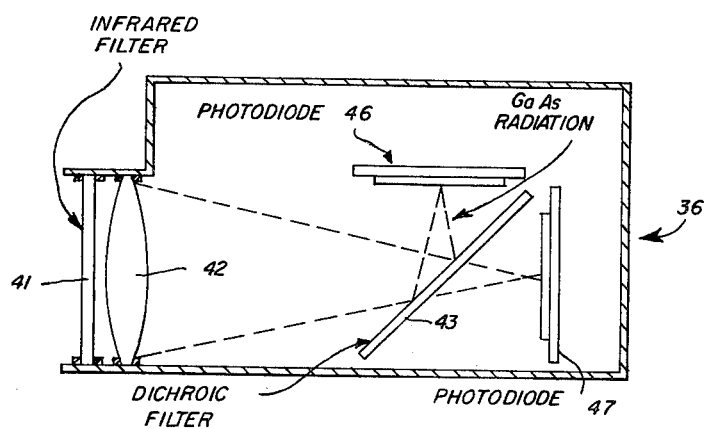
FIG. 4 is a diagrammatic representation of the optical portion of the receiver unit.

Mounted on the gun is a receiver unit 35 generally comprising an optical receiver element 36, a counting unit 37, an oscillator 38, a computer 39 and a display unit 40 which may numerically display in five digits a reciprocal sight bearing $\theta$, a target bearing $\psi$ and a target reference angle $\phi$. (see FIG. 1). The optical receiver element 36 (see FIG. 4) has an infrared filter 41 and a lens which focuses received radiation on two photo-diodes 46, 47. The dichroic diagonal filter 42 is designed to reflect the narrow band radiation at $0.9\mu$ from the light beam to photo-diode 46. The broadband radiation from the beacon is transmitted through to the split photo-diode 47. Photo-diode 47 is mounted slightly in from the focal plane so that when the gun sight is aimed at the reference unit 8, the pulsed radiation from the beacon is incident on a circular area of its surface. Accurate aiming can be achieved by equalizing the outputs from both sides of the photo-diode 47, by traversing the gun, or alternatively, the outputs can be used to control a lock-on system.

In operation, the gun sight with the optical receiver 36 thereon is pointed at the reference unit 8 and a series of pulses are received at photo-diode 47 from the beacon. The double pulse received when the light beam passes through the zero (south) direction is used to reset to zero and start a 3-digit counter display 37a of counter means 37 which means then counts and stores the number of beacon pulses received and displays these 3-digits of the angle $\theta$ at the display 40. In addition, each beacon pulse is used to stop, reset and start a two-digit counter in counter means 37 which displays on display 37b placed to the right of the 3-digit counter display 37a at the display 40. This two-digit counter registers the elapsed cycles of a local oscillator 38 whose frequency $f = 64,000 \times \eta$ Hz where $\eta$ is the rotation rate of the light beam in revolutions per second. Each cycle of the local oscillator 38, therefore, corresponds to an interpolation figure of 0.1 mil rotation of the light beam. When this two-digit counter reaches a count of 99, this number is held in the counter until the next beacon pulse is received to reset the counter to zero and restart it. Thus where $f \geq 64,000 \times \eta$ Hz any error will not be accumulative but will be corrected every 10 mils. If desired the oscillator 38 can be controlled so that its frequency can be varied to produce an exact number of pulses between any two successive beacon pulses.

The counter means 37 thus give by means of displays 37a and 37b at display 40 a reading of the angle through which the light beam has travelled from the datum (south) direction. When the light beam has travelled through an angle $\theta$, it is received by the gun receiver 36 and reflected to photo-diode 46. The resultant pulse is used to stop both counter displays and the reading obtained, $\theta$, is a measure of the angle between the optical axis of the gun sight and the north direction with a resolution of 0.1 mil.

Figure 5:
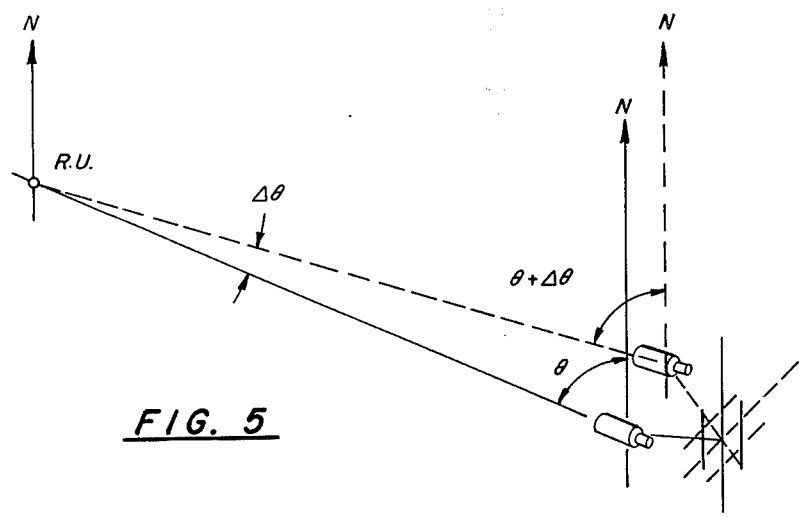
FIG. 5 (sheet 1) is a diagrammatic representation of a minor correction.

In a simple manual system the sight would be offset from the tube center line by this angle, so that when the gun is rotated to aim the sight at the reference unit 8 the tube of the gun would be pointing in the North direction. The target bearing angle $\psi$ can be radioed, for example, by voice from the battery command post to the gun operator who can manually set up a five digit display of this angle at a display 40 and additionally in the simple addition computer 39 the angle $\psi$ can be added to the angle $\theta$ to provided the angle $\phi$ which can also be displayed on a five digit display at the display 40. After the gun operator has set in the target bearing angle $\psi$ he points his gun sight at the reference unit 8 and waits until the target reference angle $\theta$ is displayed on the display 40. He then sets his gun sight scale to this reading, thus off-setting his gun sight by the amount required, and traverses the gun until his sight is again centered on the unit 8. Now a slightly different reading for the Target Reference Angle $\phi$ is displayed. The change in angle with traversal of the gun is due to the fact that the gun sight is not usually positioned on the axis of rotation of the gun but is off-set from this axis. The geometry of this effect is illustrated in FIG. 5. If $\theta$ is the original Reciprocal Sight Bearing received from the unit 8, then after traversal of the gun into the position indicated by the dash lines, the true Reciprocal Sight Bearing is $\theta + \Delta\theta$, and this is thus the angle which will now be displayed. The process of aligning the gun is thus an iterative one, the number of iterations required depends on the final accuracy sought. The magnitude of the error, $\Delta\theta$, depends on (a) the unit 8 to gun 9 distance, R, (b) the distance by which the gun sight is offset from the gun rotation axis and (c) the initial orientation of the gun.

The maximum value of the error $\Delta\theta$ ($n$), after $n$ iterations is to a rough approximation given by $$\Delta\theta (n) = 2 (r/R)^n \sin \phi/2$$

where p1 $r$ = Distance by which the gun sight is off-set from the axis of rotation.

$\phi$ = Angle through which gun is traversed.

One iteration is all that would be required in most practical cases.

Figure 6:
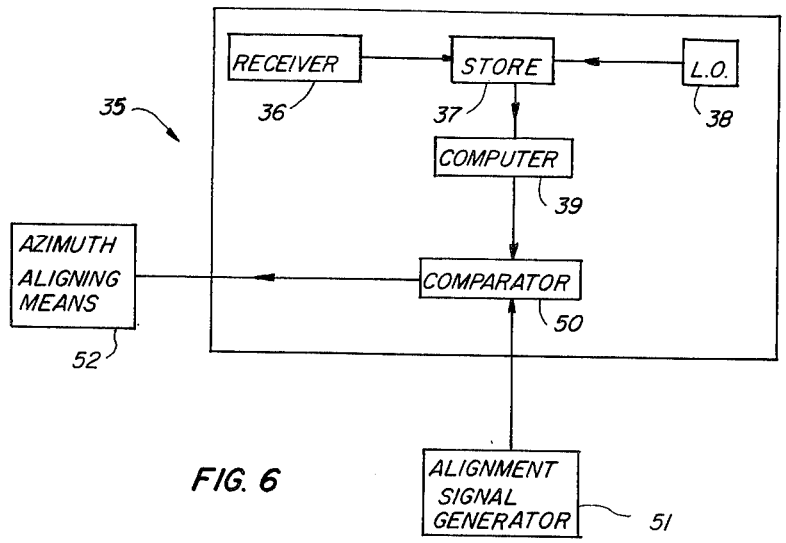
FIG. 6 is a block diagram illustrating an alternative feature.

When it is desired to automate the gun laying, a comparator 50 (See FIG. 6) is provided in the unit 35 which comparator 50 receives the angle $\phi$ from the computer 39 and compares it to the actual offset angle of the gun sight obtained from a signal generator 51, for example, a shaft encoder disc mounted on the gun sight axis, the resultant error signal generated in the comparator then being used as a command signal to control the automatic setting of the correct angle, by driving the traversing mechanism 52 of the gun (Azimuth Aligning means). It will be understood that means has to be provided to cause the gun sight itself to "lock in" to the reference unit 8 during rotation of the gun tube. A convenient method of achieving this is to provide a bi-cell photo-diode such as 47 the output of which can provide a directional error signal to drive the gun sight and maintain its optical axis in line with reference unit.

Since it is the leading edge of the light beam to which the receiver unit responds, automatic gain control is desirable in the receiver unit to maintain the required accuracy over operational distances typically of 50 to 500 metres. An optional additional provision of a manually controlled variable aperture restricts the dynamic range requirements in the amplifiers of the unit and reduces any inaccuracies at short distances (due to the finite diameter of the receiver objective lens).

When the reference unit 8 is positioned close to the gun receiver unit 10, a number of GaAs pulses will be directed at the receiver unit 10 while the light beam is incident thereon. In a preferred embodiment of this invention the first pulse of radiation received by the gun receiver 36 and reflected to the photo-diode 46 is used to stop the input from the local oscillator 38 to the counter or storage means 37. All subsequent pulses received while the light beam is incident on the aperture are added to the counter means 37 before the counts stored therein are displayed on displays 37a and 37b. Since the GaAs laser is being pulsed at a frequency corresponding to one pulse over 0.2 mil rotation of the turntable 17 and the local oscillator normally supplies interpolation pulses corresponding to every 0.1 mil rotation of the turntable 17, the angle displayed is corrected automatically to that angle corresponding to the center of the light beam incident on the center of the receiver aperture. Counting and dividing circuits can be utilized where the pulse repetition rate of the GaAs laser is not one half of the local oscillator 38 rate.

In a preferred construction a bi-cell photo-diode is provided in the Xenon receiver channel and an appropriate indicating device enables the system to be used at night-time without the use of visible aiming lights on the Reference Unit.

A GaAs pulse receiver 35 may be located in the Reference Unit 8. This, used with time measuring circuits and a simple retroreflector mounted on each gun enables Reference Unit — gun ranges to be determined.

Figure 7:
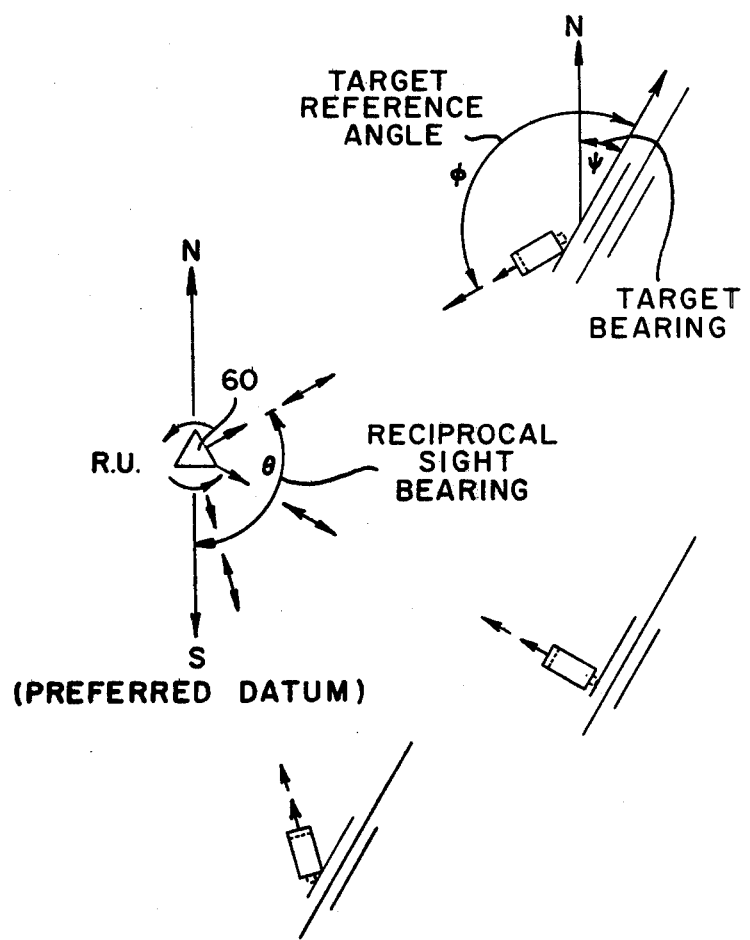
FIG. 7 is a diagrammatic representation of guns positioned with respect to a reference unit in which the reference unit carries a reflector.

In an alternative embodiment of the invention (See FIG. 7) the GaAs transmitter on the Reference Unit is replaced with a right angle prism 60 mounted with its vertex in the horizontal plane. A GaAs transmitter 61 is added to each gun unit receiver and bore-sighted with it. The system operates in a similar manner to the aforementioned embodiment. As the right-angle prism at the Reference Unit rotates through the angular position where the entrance face of the prism is perpendicular to the line jointing the Reference Unit and gun, the GaAs pulses being transmitted from the gun are reflected back to the receiver and the resulting signal is used as before. The use of a prism provides a retroreflecting property over a wide range of the vertical angles.

Conventional can be added and this system can be used as a range-finder either as part of the gun control system or for general survey use. This embodiment further is useful as a short range secure communication system.

Although the foregoing description has been limited to the application of the invention to gun alignment, it is to be understood that the invention is equally applicable to the alignment in azimuth of other elements, for example, gyro compasses of ships. In this instance the reference unit would conveniently be a shore based unit located, for example, at a harbour mouth.

What I claim as my invention is:

1. An azimuth alignment system comprising a reference unit adapted to be aligned in a known orientation; a revolving means on said reference unit for providing a highly collimated light beam; a beacon for emitting pulsed radiation; an angular encoder connected with said revolving means for causing the beacon to signal incremental angular movement of, and the passing of a datum position by, the revolving means;; a receiver means for mounting on an element to be aligned in azimuth, said receiver means having means to detect the highly collimated light beam and to receive and interpret the pulsed radiation from the beacon, and therefrom to provide azimuth information whereby said element may be aligned.

2. An azimuth alignment system as claimed in claim 1 in which the data transmission means is a beacon emitting modulated radiation.

3. A system claimed in claim 1 in which the receiver means further includes an oscillator means which interpolates between beacon pulses.

4. A system as claimed in claim 1 wherein said receiver means includes a comparator adapted to receive said data as a first input, and as a second input a signal of the alignment of the element and to produce a resultant error signal as a command signal, and means responsive to said command signal for aligning the element in azimuth.

5. A system as claimed in claim 1 in which the pulsed radiation is radiated in or near the visual spectrum and in which the light beam is a laser beam.

6. A system as claimed in claim 1 in which the revolving means providing a highly collimated beam is a transmitter of highly collimated light.

7. A device as claimed in claim 1 wherein the revolving means for providing a highly collimated beam is a reflector, a transmitter of highly collimated light being provided at the element and aimed at the reference means.

8. An azimuth alignment system comprising a reference unit adapted to be aligned in a known orientation; a beacon emitting pulsed radiation mounted on said reference unit; a revolving means on said reference unit for providing a highly collimated light beam; means connected with said revolving means for causing the beacon to signal the passing of a datum position by the revolving means; receiver means adapted to be mounted on an element to be aligned, said receiver means having means to receive and count the pulses from the beacon and to drive a display and being responsive to said signal to zero the count, and further having means adapted to detect said light beam when it passes the receiver means and lock the display count; whereby to present an indication of an angle of element position relative to said datum, by which the element may be aligned.

9. A system as claimed in claim 8 wherein said beacon emitting pulsed radiation is substantially omnidirectional and where said element is a gun.

10. A system as claimed in claim 9 in which the receiver means includes means for algebraically adding to said display a value of an angle of a target bearing to display a target reference angle whereby said gun may be laid on said target.

11. Apparatus as claimed in claim 8 wherein the receiver means further comprises an oscillator means which provides interpolation between any two successive pulses received from the beacon.

12. A system as claimed in claim 8 in which the display is provided on numerical counters.

* * * * *